United States Patent
Hanson et al.

[15] 3,687,906
[45] Aug. 29, 1972

[54] ANHYDRIDE POLYMER AMINATION PROCESS

[72] Inventors: Alden W. Hanson, Syamalarao Evani, all of Midland, Mich. 48640

[73] Assignee: The Dow Chemical Company, Midland, Mich.

[22] Filed: May 24, 1971

[21] Appl. No.: 146,468

[52] U.S. Cl. ............................................260/78.5 T
[51] Int. Cl. .............................................C08f 27/08
[58] Field of Search ................................260/78.5 T

[56] References Cited

UNITED STATES PATENTS

| | | | |
|---|---|---|---|
| 2,607,762 | 8/1952 | Bowen | 260/78.5 |
| 2,921,928 | 1/1960 | Fields et al. | 260/78 |
| 3,053,814 | 9/1962 | Hedrick | 260/78.5 |
| 3,178,395 | 4/1965 | Muskat | 260/78.5 |

Primary Examiner—Joseph L. Schofer
Assistant Examiner—John Knight, III
Attorney—Griswold and Burdick, H. L. Aamoth and A. R. Lindstrom

[57] ABSTRACT

The preparation of water soluble polymers by amination of an anhydride containing polymer such as styrene-maleic anhydride may be effected with better control and moderation of the reaction exotherm by mixing said anhydride polymer in certain proportions with a similar, previously ammoniated polymer having an excess of aminating agent absorbed thereon. The process is readily adaptable to a continuous process by merely recycling a portion of the final product to reabsorb excess aminating agent.

4 Claims, No Drawings

3,687,906

ANHYDRIDE POLYMER AMINATION PROCESS

BACKGROUND OF THE INVENTION

Styrene-maleic anhydride and like polymers may be converted to water soluble polymers by reacting the anhydride groups with ammonia to form half amide or half amide ammonium salt groups. Unfortunately the anhydride ring opening reaction with ammonia is a highly exothermic reaction and if this heat is not removed or substantially moderated the resulting products of the reaction are water insoluble cyclic imides rather than the desired water soluble half amide groups.

In addition to controlling the exotherm it is also desirable to effect this conversion to the water soluble salt form without dissolving the polymer in water or some other solvent to avoid the expense of recovering the product for sale.

A "dry" process for ammoniating anhydride polymers was proposed in U.S. Pat. Nos. 2,607,762 and 3,368,987 a solid anhydride polymer was ammoniated by agitating it in a atmosphere of ammonia gas while controlling the temperature between about 60° C and 70° C. U. S. Pat. No. 3,053,814 suggests diluting the ammonia gas with an inert gas such as nitrogen to help carry away the heat of reaction. The exotherm may also be controlled by a slow rate of addition of ammonia or by cooling the reactants. However, the production rate is decreased as the rate of ammonia addition is decreased, and cooling of the reactants is complicated by the poor heat conductance of the solid polymer and a resulting need for large heat exchange surface area. In general the efficiency of the ammonia reactant is also low.

SUMMARY OF THE INVENTION

It is an object of this invention to ammoniate anhydride containing polymers in an improved manner which makes more efficient use of the ammonia, increases the production rate and improves control and removal of the exothermic heat of reaction.

The above objects and advantages are obtained by intimately admixing in certain proportions an amount of an anhydride containing polymer wherein the polymer contains about 30 to 50 mole percent of an unsaturated dicarboxylic acid anhydride with an amount of a similar, but previously ammoniated anhydride polymer having an excess of ammonia absorbed thereon and then allowing a sufficient amount of time for the excess ammonia to react with the anhydride groups. In place of ammonia there may be used volatile, alkyl primary and secondary monoamines wherein each alkyl group has from one to four carbons. The process may be operated continuously.

DETAILED DESCRIPTION OF THE INVENTION

Ammoniation of a solid (powdery) anhydride containing polymer without removal of the exothermic heat of reaction may produce temperatures as high as 140° C which is sufficient to rapidly convert the ammoniated polymer to the water insoluble imide form. Imide formation occurs even at temperatures of about 60° C. Consequently when the solid polymer is ammoniated control of this heat of reaction is essential if a water soluble polymer is desired.

This invention accomplishes the above by employing a previously ammoniated polymer having an excess amount of ammonia absorbed thereon as the ammoniating means. When this over ammoniated polymer is admixed with fresh anhydride containing polymer there is no sudden exothermic heat evolved because of the slow release of ammonia from the over ammoniated polymer to the fresh polymer. The heat of reaction is formed more slowly and is more readily dissipated to the heat sink provided by the solid bulk of the polymers and to the surroundings.

The process may be illustrated by the following example.

EXAMPLE 1

An over ammoniated styrene-maleic anhydride copolymer (33 percent maleic anhydride, 2.5 cps) was first prepared by placing 200 grams in a one liter flask which was cooled by a cold water bath and passing ammonia as a gas for 2 hours into the stirred powdered polymer.

| Minutes | Temp. °C |
|---------|----------|
| 0       | 15       |
| 25      | 24       |
| 40      | 19       |
| 50      | 19       |
| 120     | 9        |

At the end of 2 hours, 240 gms. of product was obtained. Assuming complete reaction, the above quantity of polymer would require about 22.7 gms of ammonia (2 moles of ammonia/mole of anhydride). The additional gain in weight corresponds to an excess of ammonia of about 1.5 moles of ammonia per original mole of anhydride, assuming the total gain in weight is due to ammonia.

The process of this invention was demonstrated by placing 120 gms of the above over-ammoniated polymer at 8° C in a flask with 74 gms of fresh unreacted styrene-maleic anhydride powder (67/33) at 19° C and stirred. The temperature of reaction ranged from 8.5° to 31° C in 90 minutes. After setting 120 minutes the product (193 gms.) passed the water solubility test described below.

To be considered useful as a water soluble polymer the ammoniated polymer is tested for solubility by slurrying 10 gms of polymer into 90 gms of distilled water at 60° C in a 4 oz. bottle. The bottle is closed and intermittently shaken. At the end of 20 minutes the polymer is dissolved giving a clear solution with a pH of about 9–9.5. The percent insolubles is determined by filtering the solution through a 325 mesh stainless steel screen and determining the weight of any residue. The polymer sample is considered soluble if the percent insoluble residue is less than 0.1 percent by weight based on the polymer.

Preferably the polymers should have a particle size of less than 60 mesh to facilitate ammonia absorption. The polymer employed in Example 1 has the following typical screen analysis

| Mesh Caught On | % by wt. | Range by wt. |
|----------------|----------|--------------|

| | | |
|---|---|---|
| 30 | 0 | 0–0.06 |
| 40 | 0.04 | 0–0.07 |
| 50 | 0.07 | 0.–0.09 |
| 60 | 0.61 | 0–1.3 |
| 70 | 3.87 | 3–7 |
| 80 | 6.89 | 5–12 |
| 100 | 18.01 | 15–30 |
| –110 | 70.51 | 55–75 |
| Total | 100.00 | |

Since reaction depends on diffusion, absorption and reaction are favored by a smaller particle size.

In addition to styrene-maleic anhydride copolymer this invention contemplates any polymer containing from about 30 to 50 mole percent of an unsaturated dicarboxylic acid anhydride and correspondingly from 50 to 80 mole percent of a copolymerizable monomer. Said anhydrides, typified by maleic anhydride, tend to copolymerize in equal molar proportions, hence this establishes the upper level of anhydride content. The lower limit is established by the minimum amount of anhydride usually necessary to obtain water solubility.

Maleic anhydride is the most available and widely used anhydride and is preferred herein. However, other anhydrides may be used in place of or at least partly in place of maleic anhydride such as itaconic anhydride, chloromaleic anhydride, aconitic anhydride, citraconic anhydride and others.

Copolymerizable monomers include alkenyl aromatics such as styrene, which is a preferred monomer, vinyl toluene, $\alpha$-methyl styrene, t-butyl styrene and the like; vinyl ethers such as methyl vinyl ether, ethyl vinyl ether, etc., vinyl esters such as vinyl acetate or proprionate; $\alpha$-olefins such as ethylene, propylene and butylene; and any other monomer which is copolymerizable in the above proportions. Of course, the copolymerizable monomer should be devoid of any group reactive with any anhydride group.

Anhydride containing polymers of the above composition are well known as well as methods for their preparation. A widely used method is to prepare the polymers by solution polymerization in a solvent which is a solvent for both the monomers and the polymer employing free radical catalysts such as benzoyl peroxide. As indicated the monomers prefer to copolymerize in equal molar quantities. U.S. Pat. No. 3,336,267 discloses how to make nonequal molar copolymers, e.g., 30 mole percent anhydride copolymers. A variety of other preparative methods are known, some of which are described in U.S. Pat. Nos. 3,418,292; 3,178,395; 2,971,939 and 2,838,475.

While the invention has been chiefly described with respect to ammoniation, the process relates more generally to an amination process, which in addition to ammonia, includes lower alkyl primary and secondary monoamines. Typical of such amines are methyl and dimethyl amine, ethyl and diethylamine, and other similar amines with alkyl groups of up to four carbon atoms. It is to be understood that whenever the process is described as an ammoniation process that said amines may also be employed in place of ammonia. Advantageously, liquid ammonia may be employed in place of gaseous ammonia whereby the cooling effect of liquid ammonia assists in controlling the temperature.

The over ammoniated (or aminated) anhydride polymer which is employed as the ammoniating agent contains at least about a 50 percent excess of ammonia. Since two moles of ammonia per mole of anhydride are required to fully react with each anhydride group the 50 percent excess is equivalent to about one (1) additional mole of ammonia per original anhydride group. Lesser amounts of excess ammonia than this take too long to diffuse and react with the fresh anhydride polymer, although of course lesser amounts will ultimately react. Lesser amounts of excess ammonia also have the disadvantage in that each part of over ammoniated polymer is capable of ammoniating less and less parts of fresh polymer. The above described excess represents a practical amount based both on productivity and rate of ammoniation.

With respect to proportions of over ammoniated polymer mixed with fresh anhydride polymer the proportions should be such that there is present in the mixture at least about 1 mole of ammonia per anhydride group since this is about the minimum amount to obtain a water soluble product. Once the mixture of polymers has been intimately blended all that is necessary is to allow sufficient time for the ammonia to desorb from the over ammoniated polymer and adsorb and react with the fresh anhydride polymer. Once the reaction is essentially complete a portion of the product mixture may then be returned to a chamber to re-absorb excess ammonia and the process is repeated.

Obviously the above process lends itself readily to a continuous process in which a portion of the product is continuously recycled through an ammonia absorber back to the mixing stage. It is desirable in such a process to control the temperature of the ammonia absorber between about 25°–55° C. Control of temperature is not difficult since the principal heat generating reaction, i.e., the opening of the anhydride ring by at least one mole of ammonia, has already been completed prior to this reabsorption step. Control of temperature may also be obtained by employing liquid ammonia in place of the more commonly used gaseous ammonia. The temperature limits are practical limits which relate to the amount of ammonia which can be absorbed and the rate at which it is absorbed. The upper limit also is related to minimizing the formation of imide groups.

The following non-limiting examples will further illustrate the invention.

EXAMPLE 2

A mixture of 60 grams of the over ammoniated polymer of Example 1 at 18° C was mixed with 37 grams of a similar, but unreacted, styrene-maleic anhydride copolymer powder at 19° C and stirred. In 60 minutes the temperature rose to 29.5° C. After setting for 16 hours, 96 grams of product was obtained which passed the previously described solubility test. The nitrogen content, by analysis, was 6.93 percent.

Similar results are obtained if the maleic anhydride content is varied up to 50 mole percent.

EXAMPLE 3

Similar to Example 1, 200 grams of styrene-maleic anhydride were over ammoniated giving 229 grams of product having a nitrogen content, by analysis, of 9.9 percent. A 57 gram portion of this over ammoniated polymer was mixed with 13 grams of fresh unreacted anhydride polymer, both at 19° C and allowed to stand overnight. The reaction temperature did not exceed 30° C. The product passed the water solubility test and had a nitrogen content of 7.77 percent.

What is claimed is:

1. An improved process for preparing water soluble polymers by amination of an anhydride containing polymer wherein said polymer contains about 30 to 50 mole percent of an unsaturated dicarboxylic acid anhydride, said process comprises
    a. intimately mixing said anhydride polymer with a similar over aminated anhydride polymer having at least about a 50 percent excess of aminating agent absorbed thereon in proportions such that there is present in the mixture an amount of excess aminating agent equivalent to at least about 1 mole of said aminating agent per mole of unreacted anhydride; and
    b. allowing a sufficient amount of time for said excess aminating agent to substantially react with said anhydride groups, wherein said aminating agent is ammonia or a one to four carbon alkyl primary or secondary monoamine.

2. The process of claim 1 wherein said anhydride is maleic anhydride.

3. The process of claim 2 wherein said anhydride polymer is a copolymer of styrene and maleic anhydride.

4. The process of claim 1 wherein said aminating agent is liquid or gaseous ammonia.

* * * * *

UNITED STATES PATENT OFFICE
CERTIFICATE OF CORRECTION

PO-1050 (5/69)

Patent No. 3,687,906    Dated August 29, 1972

Inventor(s) Alden W. Hanson, Syamalarao Evani and Lewis R. Drake

It is certified that error appears in the above-identified patent and that said Letters Patent are hereby corrected as shown below:

On first page of patent (page following cover), the inventors are incorrectly listed as "Alden W. Hanson, Syamalarao Evani". Inventors should correctly read as --Alden W. Hanson, Syamalarao Evani and Lewis R. Drake--.

Column 2, line 68, third column of table is incorrectly listed as "Range by wt.". It should read --Range % by wt.--

Signed and sealed this 6th day of March 1973.

(SEAL)
Attest:

EDWARD M. FLETCHER, JR.
Attesting Officer

ROBERT GOTTSCHALK
Commissioner of Patents